US006444267B1

(12) United States Patent
Choi et al.

(10) Patent No.: US 6,444,267 B1
(45) Date of Patent: Sep. 3, 2002

(54) METHOD FOR MANUFACTURING GRAVURE-TRANSFER-COATED STEEL PLATE

(75) Inventors: Janghyun Choi; Sungsu Jeon; Sungkwon Ahn; Chulho Kwon, all of Pusan (KR)

(73) Assignee: Union Steel Manufacturing Co., Ltd., Pusan (KR)

( * ) Notice: Subject to any disclaimer, the term of this patent is extended or adjusted under 35 U.S.C. 154(b) by 0 days.

(21) Appl. No.: 09/787,432

(22) PCT Filed: Mar. 25, 2000

(86) PCT No.: PCT/KR00/00262

§ 371 (c)(1), (2), (4) Date: Mar. 26, 2001

(87) PCT Pub. No.: WO01/72524

PCT Pub. Date: Oct. 4, 2001

(51) Int. Cl.[7] ............................ B05D 1/38; B05D 5/04; B05D 3/02; B05D 3/12; C08F 61/00

(52) U.S. Cl. ....................... 427/258; 427/278; 427/359; 427/270; 525/520

(58) Field of Search ................................ 427/258, 267, 427/270, 271, 274, 277, 278, 280, 287, 355, 359, 409; 525/520, 440, 441, 517.5; 524/500, 539, 542, 489, 590, 601; 523/500

(56) References Cited

U.S. PATENT DOCUMENTS 3,962,369 A * 6/1976 Chang et al. ............... 428/121
4,812,336 A * 3/1989 Okamoto et al. ........... 427/257

FOREIGN PATENT DOCUMENTS

| | | | |
|---|---|---|---|
| JP | 63-062576 | * 3/1988 | ............ B05D/5/06 |
| JP | 09-277723 A | 10/1997 | |
| KR | 87-176 A | 2/1987 | |
| KR | 98-073736 A | 11/1998 | |

* cited by examiner

*Primary Examiner*—Shrive P. Beck
*Assistant Examiner*—William Phillip Fletcher, III
(74) *Attorney, Agent, or Firm*—Bacon & Thomas

(57) ABSTRACT

A method for manufacturing a gravure transfer-coated continuous metal plate, wound in the form of a coil, comprising: coating, over the metal plate, a primer coating material; curing the primer coating material to form a lower coating layer; thermally transferring a desired pattern from a gravure transfer sheet onto the lower coating layer, thereby forming a transfer coating; coating, over the transfer coating, an upper coating material of thermosetting fluorine resin, thermosetting polyester resin, or UV-thermosetting polyurethane-acryl-based resin; and curing the upper coating material to form an upper coating layer. The primer coating material consists essentially of: 20–40% polyester resin having a number average molecular weight of 5,000–20,000 and a glass transition temperature of 10–50° C., 4–15% melamine resin, 1–10% urethane resin, 0.3–3% isocyanate, 15–35% pigment 30–50% hydrocarbon/ester-based mixed solvent, and 1.5–3% additives.

6 Claims, 3 Drawing Sheets

METHOD FOR MANUFACTURING GRAVURE-TRANSFER-COATED STEEL PLATE

This application is a National Stage of PCT/KR00/00262, filed Mar. 25, 2000.

TECHNICAL ART

The present invention relates to a method for manufacturing a gravure-transfer-coated steel plate.

BACKGROUND ART

Coated steel plates are known which are manufactured by forming patterns over a continuous steel plate wound in the form of a coil. For conventional methods of manufacturing such coated steel plates, there are those using a simple coating method and those using an offset printing method. In the former case using a simple coating method, it is difficult to form diverse patterns over a steel plate because the coating method used is simple. On the other hand, in the latter case using an offset printing method, it has been industrially implemented only for limited patterns such as patterns of wood textures.

Meanwhile, Japanese Laid-open Patent Publication No. Sho. 58-205567 discloses a method for manufacturing a coated steel plate by forming a primer layer (a lower coating) over a continuous metal plate wound in the form of a coil, by use of double coating and double baking processes, pressing a thermal transfer sheet onto the primer layer on the metal plate, and then forming an upper coating over the thermal transfer sheet.

Also, Japanese Laid-open Patent Publication No. Hei. 4-280994 discloses a method for manufacturing a transfer-coated steel plate using a thermal pressing transfer process. The disclosed method is adapted to reduce the surface roughness of a steel plate applied, thereby obtaining a high brightness. In accordance with this method, coated steel plates free of coating defects can be manufactured even when a thin film coating is carried out using a roll coating process.

However, the above mentioned method involves drawbacks in that it is necessary to use steel plates exhibiting a high brightness, that the primer layer (the lower coating) adapted to provide a desired corrosion resistance and a desired surface smoothness is formed using double coating and double baking processes, that the thermal transfer temperature used is lower than that in a general PCM(PRE-COATED METAL) color line, and that the line speed is low, for example, 5 to 40 MPM.

Recently, laminar steel plates have been commercially available which are formed by printing diverse patterns over a film, and then laminating those patterns over a steel plate. In such plate products, there is a problem in that chlorine or dioxine gas, which are undesirable in terms of their negative effect on the environment, may be generated when those plate products are melted for the regeneration of metal plates.

DISCLOSURE OF THE INVENTION

The present invention has been made in view of the above mentioned problems, and an object of the invention is to provide a method for manufacturing a gravure-transfer-coated steel plate, which is capable of transferring a pattern from a gravure transfer sheet over a metal plate without any additional adjustment for processing conditions of a general PCM color line, thereby producing a gravure-transfer-coated steel plate having a beautiful appearance and a high workability.

In accordance with the present invention, this object is accomplished by providing a method for manufacturing a continuous gravure-transfer-coated metal plate by transferring a pattern over a continuous metal plate wound in the form of a coil using a gravure transfer sheet, comprising the steps of: coating, over the metal plate, a primer coating material essentially consisting of 20 to 40% of a polyester resin having a number average molecular weight of 5,000 to 20,000 while exhibiting a glass transition temperature of 10 to 50° C., 4 to 15% of a melamine resin, 1 to 10% of a urethane resin, 0.3 to 3% of isocyanate, 15 to 35% of a pigment, 30 to 50% of a hydrocarbon and ester-based mixed solvent, and 1.5 to 3% of additives; heating and setting the primer coating layer in a hot-air-blowing dry oven, thereby forming a lower coating layer; thermally pressing a gravure transfer sheet, printed with a desired pattern on a base film layer thereof, onto the lower coating layer; releasing the base film of the gravure transfer sheet from the lower coating layer, thereby transferring the pattern, as a transfer coating layer, to the lower coating layer; coating, over the transfer coating layer, an upper coating material selected from the group consisting of a thermosetting fluorine resin, a thermosetting polyester resin, and an ultraviolet-thermosetting polyurethane-acryl-based resin; and heating and setting the upper coating layer or radiating ultraviolet rays onto the upper coating layer, thereby forming an upper coating layer.

The substrate metal plate used in the method of the present invention may include any kind of known steel plates, for example, an aluminum plated steel plate, a zinc-aluminum alloy hot dipped steel plate, a copper plated steel plate, a tin plated steel plate, a chromium plated steel plate, a nickel plated steel plate, and a zinc galvanized and hot dipped steel plate.

The substrate metal plate may be subjected to a chromate treatment in order to improve the corrosion resistance of the metal plate and the bondability of the primer coating (lower coating) material to the metal plate. Preferably, the chromate treatment is carried out by coating a chromate layer over the substrate metal plate.

The primer coating layer functions to improve the bondability of the transfer coating layer to the surface of the metal plate. In some cases, the primer coating layer also functions to provide a background color for the transfer coating layer (transfer pattern). The primer coating layer has an inseparable relation with the transfer coating layer to be formed thereover. Where there is an undesirable characteristic difference between the primer coating layer and transfer coating layer, problems may occur in terms of the bondability between those coating layers and the hardness of the coating layers. A coating crack and a yellowing phenomenon caused by ultraviolet rays may also occur. For the primer coating material, those should be used which are free of an occurrence of popping when they are dried by a flow of blown hot air in a subsequent setting process conducted after the coating process while exhibiting a superior bondability to the transfer coating layer, a superior workability, a high weather resistance, and a high corrosion resistance.

The primer coating material contains, as a major resin thereof, a flexible polyester resin having a number average molecular weight of 5,000 to 20,000 while exhibiting a glass transition temperature of 10 to 50° C. The reason why the flexible polyester resin is used is to allow the primer coating material to exhibit a high elongation, in addition to the basic physical properties of the lower coating material such as corrosion resistance, bondability to the transfer coating layer and plated metal plate, and surface smoothness, thereby exhibiting a sufficient buffering function at the interface between the metal plate and transfer coating layer to allow cracks formed at the metal plate during a treatment for the metal plate to be absorbed by the lower coating layer without being propagated to the transfer coating layer. In order to allow the polyester resin to exhibit a maximum elongation, it is necessary to inhibit the formation of functional groups. To this end, polyhydroxyl alcohol such as ethylene glycol is used in the synthesis of the polyester resin to allow the functional groups, such as hydroxyl groups (—OH) or carboxyl groups (—COOH), branched to the main chain of the polyester resin to have a linear structure.

The primer coating material also contains a crosslinking resin (thermosetting resin) for a coating formation. A mixed resin of methylated and buthylated melamine resins may be used for the crosslinking resin. For such a melamine resin, RESIMINE 755, RESIMINE 757, RESIMINE 751 (manufactured by SOOLUTIA Company, U.S.A.), CYMEL 1168, CYMEL 1170, and CYMEL 232 (CYTEL Company, U.S.A.) are commercially available. The primer coating material also contains a setting promoter which may include a sulfonic acid masked with an epoxy resin, such as P-toluene sulfonic acid or dinonyl naphthalene sulfonic acid. The setting promoter is used in an amount of 0.3 to 3 parts by weight based on the weight of the primer coating material. Preferably, the setting promoter is used in an amount of 0.5 to 2 parts by weight. Where the setting promoter is used in an amount of less than 0.3 parts by weight, an insufficient setting of the coating may occur under certain conditions. Where the amount of the setting promoter exceeds 3 parts by weight, the coating is too rapidly set, so that a popping or shrinkage phenomenon may occur in the coating.

In order to achieve an improvement in bondability, an assistant crosslinking resin may also be used. For the assistant crosslinking resin, a non-yellowing isocianate such as a masked hexamethylene di-isocianate may be used. The assistant crosslinking resin is used in an amount of 1 to 10 parts by weight based on the weight of the primer coating material. Preferably, the assistant crosslinking resin is used in an amount of 3 to 7 parts by weight. Where the assistant crosslinking resin is used in an amount of less than 1 part by weight, the effect of improving the bondability of the coating is degraded. Where the amount of the assistant crosslinking resin exceeds 10 parts by weight, an increase in the cost of the coating material occurs.

A catalyst for the assistant crosslinking resin is also used in an amount of 0.5 to 1 part by weight, preferably 0.5 to 1 part by weight, based on the weight of the primer coating material. Where the catalyst is used in an amount of less than 0.1 part by weight, its effect is degraded, thereby degrading the effect of improving the bondability. On the other hand, where the amount of the catalyst is more than 2 parts by weight, a yellowing phenomenon occurs. In the latter case, an increase in the cost of the coating material also occurs.

Where the substrate, to which the primer coating material is applied, is of the interior, the primer coating material is added with a $TiO_2$ white pigment. On the other hand, the substrate is of the exterior, an anti-corrosive pigment is added to the primer coating material in order to achieve an improvement in corrosion resistance. Of course, the anti-corrosive pigment may be used irrespective of the interior or exterior substrate, if desired by the consumer. If necessary, an ultraviolet filler may also be added for an enhancement in anti-ultraviolet property.

A preferable composition of the primer coating material is described in the following Table 1.

TABLE 1

| Composition | Ingredients | Content (% by weight) |
|---|---|---|
| Resin | Major resin (Polyester resin) | 20 to 40 |
| | Melamine resin | 4 to 15 |
| | Urethane resin | 1 to 10 |
| | Assistant resin | 0.3 to 3 |
| Pigment | Titanium oxide ($TiO_2$) | 15 to 35 |
| | Anti-corrosive pigment | 0 to 10 |
| Additive | Deforming agent | 0.5 to 1.0 |
| | Leveling agent | 0.5 to 1.0 |
| | UV filler | 0.5 to 1.0 |
| Solvent | Hydrocarbon based | 15 to 25 |
| | Ester based | 15 to 25 |

The gravure transfer sheet includes a base film printed with a desired pattern and a desired color. The pattern of the gravure transfer sheet is transferred to a steel plate coated with a primer using heat and pressure. Thus, color steel plates printed with diverse patterns can be produced.

The base film of the transfer sheet used in accordance with the present invention may have a single-layer structure consisting of a plastic film exhibiting a relatively high heat resistance, such as a polypropylene film or a PET film. Alternatively, the base film may have a multi-layer structure consisting of an optional substrate, and the above mentioned plastic film laminated over the optional substrate. The pattern and color of the transfer sheet is printed using a transfer ink. Transfer sheets for metal, which are cooperatively manufactured by YUNHAP Steel Industry Co., Ltd., in Pusan, Korea, and Sunjin Co., Ltd., in Seoul, Korea, and use a PET film as a base film, may be commercially available for the transfer sheet. The transfer sheet has a multi-layer structure mainly including five layers in terms of the function thereof. That is, the transfer sheet has a base film (PET film), and a protective layer for allowing an easy release of the base film while protecting a printed layer. The printed layer, which is also included in the transfer sheet, is printed with a desired pattern and a desired color. The transfer sheet also has a reinforcing layer for hiding and reinforcing the metal plate, onto which the printed layer is to be transferred, and an adhesive layer for enhancing the bonding force of the printed layer to the primer layer.

The upper coating layer coated over the transfer coating layer may be made of a thermosetting fluorine resin, a thermosetting polyester resin, or an ultraviolet-thermosetting polyurethane-acryl-based resin. Preferably, the upper coating layer is made of polyester resin having a number average molecular weight of 5,000 to 20,000 while exhibiting a glass transition temperature of 40 to 70° C., in terms of the costs. Taking into consideration the reactivity of the upper coating material to the transfer coating layer and the ultraviolet resistance of the upper coating material, it is necessary to limitatively select the solvent, antifoaming agent, and crosslinking agent used. Where the metal plate is used for exterior purposes, it is desirable to use an ultraviolet filler. Where a polyester resin is used for the upper coating material, it is preferable to use a mixture of a hydrocarbon-based solvent and an ester-based solvent. For the crosslinking resin, it is preferable to use melamine and urethane.

BRIEF DESCRIPTION OF THE DRAWINGS

The above objects, and other features and advantages of the present invention will become more apparent after a reading of the following detailed description when taken in conjunction with the drawings, in which.

BEST MODE FOR CARRYING OUT THE INVENTION

Figure 1:
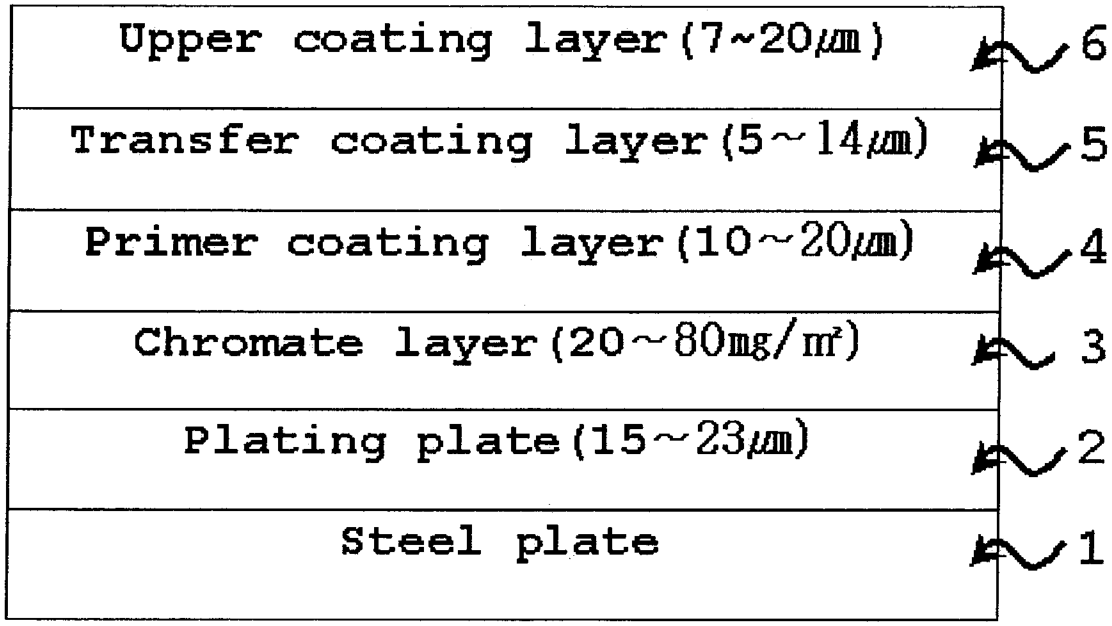
FIG. 1 is a schematic view illustrating the laminated structure of a transfer-coated metal plate manufactured in accordance with a manufacturing method of the present invention.
Figure 2:
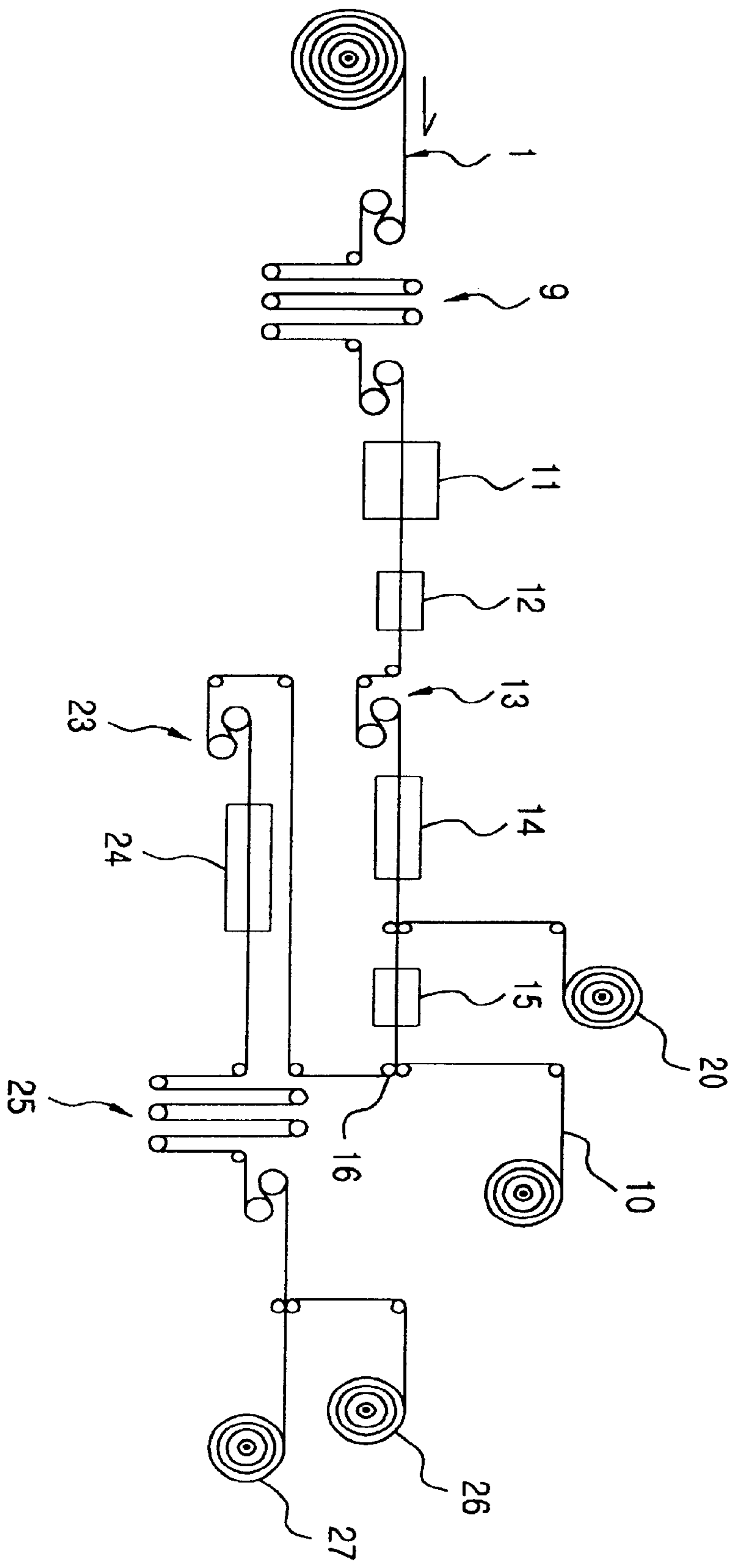
FIG. 2 is a schematic view illustrating a continuous process line used to carry out the manufacturing method of the present invention.

Now, a preferred embodiment of the present invention for manufacturing transfer-coated steel plates will now be described in conjunction with FIGS. 1 and 2.

In accordance with the present invention, as a blank, a steel plate 1 is first prepared which is wound in the form of a coil and formed with a plating layer 2 having a thickness of 15 to 23 μm. Coating chromate is coated in the form of a thin film over the steel plate 1 at a rate of 20 to 80 MPM in accordance with a roll coating method. The resulting coating is then dried using a flow of hot air blown in a drier 12 under the condition using a peak metal temperature (PMT) of 60 to 140° C., thereby forming a chromate layer 3 over the steel plate 1 at a density of 20 to 80 mg/m$^2$. Subsequently, a primer coating material is coated to a thickness of 10 to 20 μm [based on DFT (Dried Film Thickness)] over the chromate layer 3 in accordance with the roll coating method. The resulting coating is then heated and dried at a temperature of 160 to 280° C. using a flow of hot air blown in a drying oven 14, thereby forming a primer coating layer 4 over the chromate layer 3. Although the curing condition of the primer coating layer 4 is determined depending on the width and thickness of the steel plate and the line speed for the steel plate, the curing temperature used for the primer coating layer 4 is preferably ranged from 180° C. to 260° C. Where the DFT of the primer coating layer 4 is less than 10 μm, the irregularities on the surface of the steel plate may appear on the primer coating layer 4, thereby resulting in occurrence of a popping phenomenon in a subsequent transfer process. Furthermore, the steel plate is insufficiently hidden, so that it is impossible to obtain a consistent color reproducibility. A degradation in workability also occurs. On the other hand, where the DFT of the primer coating layer 4 is less than 20 μm, it may exhibit a degradation in the contactability to the blank. There is also a degradation in terms of the costs. Most preferably, the DFT of the primer coating layer 4 is 14 to 15 μm.

Thereafter, a gravure transfer sheet 20 is attached to the steel plate 1 coated with the primer coating layer (namely, the lower coating) and maintained at 170 to 220° C. based on PMT. The gravure transfer sheet 20 has a blank film thickness of 20 to 30 μm, a printed transfer coating thickness of 5 to 14 μm, and a total transfer sheet thickness of 25 to 44 μm. The gravure transfer sheet 20 is then pressed against the steel plate 1 using a heat-resistant elastic rubber roll 16 having a hardness No. of 70 to 90 measured by a Shore rubber hardness meter and a crown dimension of 0.5 to 1.3 mm (indicated by "C" in FIG. 3) while being maintained at a surface temperature of 40 to 60° C. Thus, the transfer coating layer of the gravure transfer sheet 20 is transferred to the surface of the primer-coated steel plate 1. Subsequently, water is sprayed onto the gravure transfer sheet 20 using a cooling unit 15 in order to cool the surface of the gravure transfer sheet 20. After the cooling process, the outer film of the transfer sheet 20, that is, the base film 10, is then released from the steel plate 1. Accordingly, a gravure transfer coating layer 5 is formed on the primer coating layer 4. The base film of the transfer sheet 20 is preferably made of a general PET having a bidirectionally-oriented crystallinity providing a superior heat resistance and a superior tensile strength.

Preferably, the base film has a thickness of 20 to 30 μm. Where the base film has a thickness of less than 20 μm, it exhibits a degraded heat resistance and a degraded tensile strength. On the other hand, at a thickness of more than 30 μm, the base film has a drawback in that there is a degradation in terms of the costs. Also, it is preferred for the transfer coating layer 5 to have a thickness of 5 to 14 μm. When the transfer coating layer 5 has a thickness of less than 5 μm, it may have a degraded releasability and a degraded bondability. On the other hand, at a thickness of 14 μm, the transfer coating layer 5 exhibits a degradation in terms of workability and costs. Most preferably, the transfer coating layer 5 has a thickness of 10 μm.

As mentioned above, the elastic roll 30 preferably has a hardness No. of 70 to 90 measured by the Shore rubber hardness meter. When the elastic roll 30 has a hardness No. beyond the range of 70 to 90, no transfer of the transfer coating layer may easily occur. Most preferably, the hardness No. of the elastic roll 30 is ranged from 75 to 85. Where the crown dimension of the elastic roll 30 is less than 0.5 mm, no transfer of the transfer coating layer may occur at the central portion of the surface of the steel plate 1. On the other hand, where the crown dimension of the elastic roll 30 is more than 1.3 mm, no transfer of the transfer coating layer may occur at the edge portion of the surface of the steel plate 1. Most preferably, the crown dimension of the elastic roll 30 is ranged from 0.7 mm to 0.9 mm.

It is more preferable for the elastic roll 30 to be maintained at a lower temperature. However, it is difficult to maintain the elastic roll 30 at a temperature of less than 40° C. because the transfer process is conducted in a continued fashion. Accordingly, the elastic roll 30 is preferably maintained at a temperature of not more than 60° C. In FIG. 2, the reference numerals 9 and 25 denote an inlet accumulator and an exit accumulator, respectively. The reference numeral 11 denotes a chromate pre-treatment unit. Also, the reference numerals 13 and 23 denote a primer coater and an upper coating coater, respectively.

An upper coating layer 6 is then coated over the transfer coating layer 5 formed under the above mentioned condition, using a roll coating method in order to provide a superior workability and a high weather resistance. The material of the upper coating layer 6 may be appropriately selected in accordance with the application of the product. Preferably, a fluorine or polyester-based material, which can be dried in accordance with a curing process, is used for the material of the upper coating layer 6. The upper coating layer 6 is roll-coated to have a thickness of 7 to 20 μm based on DFT. The resultant transfer-coated steel plate roll-coated with the upper coating layer 6 is then dried in a hot-air-blowing dry oven 24 at an atmospheric temperature of 160 to 320° C. (corresponding to 210 to 240° C. based on a PMT temperature). After the completion of the drying process, a desired transfer-coated steel plate formed with the above mentioned layers is obtained. In FIG. 2, the reference numeral 26 denotes a protective film, and the reference numeral 27 denotes a recoiler.

Where the DFT of the upper coating layer 6 is less than 7 μm, it is impossible to obtain a desired workability and a high weather resistance. On the other hand, where the upper coating layer 6 has a DFT of more than 20 μm, undesirable effects may be generated in terms of economy. A popping phenomenon may also occur. Preferably, the DFT of the upper coating layer 6 is ranged from 13 μm to 15 μm.

In order to provide high brilliance, high hardness and reach visual beauty at the surface of the product, a UV-dried polyurethane-acryl-based coating material may be used for the upper coating layer 6. In this case, the upper coating layer 6 is coated to a DFT of 2 to 200 μm using a flow curtain coating method.

In order to allow the surface of the transfer-coated steel plate to have a cubic effect, the steel plate may also be subjected to a pressing process using an embossing roll formed with a pattern of irregularities after the formation of the upper coating layer 6.

The following Table 2 describes the properties of the transfer-coated steel plate manufactured in accordance with the method of the present invention, along with a comparative sample which is a color coated steel plate commercially available from Dongshin Special Steel Manufacturing Co., Ltd.

TABLE 2

Figure 3:
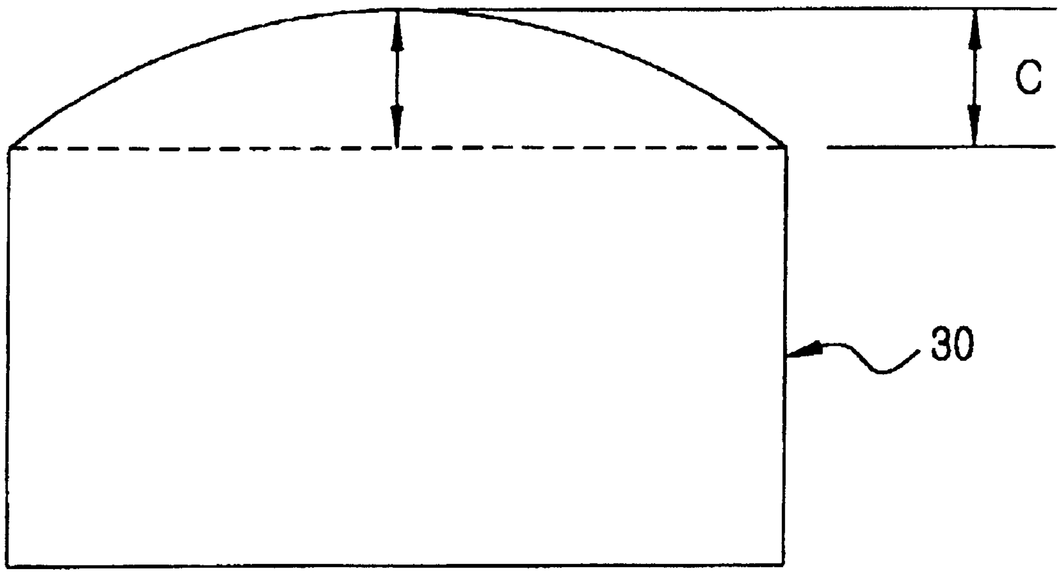
FIG. 3 is a schematic view illustrating the crown dimension of an elastic roller (press roller) used in accordance with the manufacturing method of the present invention.

| Test | Present Sample | Comparative Sample | Allowance | Test Conditions | Remark |
|---|---|---|---|---|---|
| Peel-off Test | ○ | ○ | Based on Minimum Value | Tensile Load of 50 mm/min | |
| Ericsson Test | ○ | Δ | Not To Be Peeled off | 5 mm Cross Cut 9 mm Ericsson | |
| Bending Test | ○ | Δ | Not To Be Scratched, Broken, and Peeled off | Bending by 4T (25 ± 5° C.) | |
| Solvent Resistance Test | 70 Times | 30 Times | Relative Comparison | M.E.K Rubbing | |
| Chemical Resistance Test | ○ | ○ | Not To Exhibit Corrosion and Variation in Surface Color | 10% NaOH Solution Ethyl alcohol | |
| Ultraviolet Resistance Test | ○ | X | Not To Be Glossy and Blistery | 20 w × 20 cm × 500 hr | |
| Weather Resistance Test | ○ | X | Relative Comparison | Irradiation for 300 hr Using XENON ARC Lamp | |
| Scratch Resistance Test | 2H- | H- | Not To Exhibit Corrosion | Limit Value of Resistance to Scratch Using Mitsubishi Pencil | Surface Hardness |
| Corrosion Resistance Test | ○ | Δ | Maximum Chromaticity Index | S.S.T 1,000 hr 35 5% NaCl | |
| Surface Appearance | 6 Degrees | 3 Degrees | | Macroscopically Observed | Referring to FIG. 3 |

○: Good
Δ: Normal
X: Bad

Referring to the above Table, it can be found that the transfer-coated steel plate manufactured in accordance with the method of the present invention is superior in terms of physical properties, appearance and workability, as compared to the conventional printed steel plate (the comparative sample).

INDUSTRIAL APPLICATION

As apparent from the above description, in accordance with the present invention, it is possible to manufacture, at a relatively high rate in a continuous line, transfer-coated steel plates exhibiting superior physical properties in terms of workability, ultraviolet resistance, scratch resistance, and solvent resistance, as compared to conventional color coated steel plates. The transfer-coated steel plate of the present invention can be used for a variety of products for indoor and outdoor purposes.

What is claimed is:

1. A method for manufacturing a continuous gravure-transfer-coated metal plate by transferring a pattern over a continuous metal plate wound in the form of a coil using a gravure transfer sheet, comprising the steps of:

coating, over the metal plate, a primer coating material consisting essentially of 20 to 40% of a polyester resin having a number average molecular weight of 5,000 to 20,000 while exhibiting a glass transition temperature of 10 to 50° C., 4 to 15% of a melamine resin, 1 to 10% of a urethane resin, 0.3 to 3% of isocyanate, 15 to 35% of a pigment, 30 to 50% of a hydrocarbon and ester-based mixed solvent, and 1.5 to 3% of additives;

heating and setting the primer coating layer in a hot-air-blowing dry oven, thereby forming a lower coating layer;

thermally pressing a gravure transfer sheet, printed with a desired pattern on a base film layer thereof, onto the lower coating layer;

releasing the base film of the gravure transfer sheet from the lower coating layer, thereby transferring the pattern, as a transfer coating layer, to the lower coating layer;

coating, over the transfer coating layer, and upper coating material selected from the group consisting of a thermosetting fluorine resin, a thermosetting polyester resin, and an ultraviolet-thermosetting polyurethane-acryl-based resin; and heating and setting the upper coating layer or radiating ultraviolet rays onto the upper coating layer, thereby forming an upper coating layer.

2. The method according to claim 1, further comprising the step of:

subjecting the upper coating layer to a pressing process using an embossing roll formed with a pattern of irregularities in such a fashion that a cubic pattern is formed on an upper surface of the transfer-coated metal plate.

3. The method according to claim 1, wherein respective layers of the transfer-coated metal plate have the following thicknesses:

the primer coating layer: a thickness of 10 to 20 μm based on a dried film thickness;

the transfer coating layer: a thickness of 5 to 14 μm; and the upper coating layer: a thickness of 7 to 20 μm in the case of a cure-dried type, and 5 to 200 μm in the case of an ultraviolet-dried type.

4. The method according to claim 1, wherein the upper coating material comprises a polyester resin having a number average molecular weight of 5,000 to 20,000 while exhibiting a glass transition temperature of 40 to 70° C.

5. The method according to claim 1, wherein the step of thermally pressing the gravure transfer sheet onto the lower coating layer is carried out using a heat-resistant elastic rubber roll having a hardness No. of 70 to 90 measured by a Shore rubber hardness meter, and a crown dimension of 0.5 to 1.3 mm.

6. The method according to claim 5, wherein the heat-resistant elastic rubber roll has a hardness No. of 75 to 85, and a crown dimension of 0.7 to 0.9 mm.

* * * * *